US012695042B2

(12) United States Patent
Dai et al.

(10) Patent No.: US 12,695,042 B2
(45) Date of Patent: Jul. 28, 2026

(54) RELAY

(71) Applicant: Xiamen Hongfa Electric Power Controls Co., Ltd, Xiamen (CN)

(72) Inventors: Wenguang Dai, Xiamen (CN); Zengguang Zheng, Xiamen (CN); Fangneng Li, Xiamen (CN); Shuming Zhong, Xiamen (CN)

(73) Assignee: Xiamen Hongfa Electric Power Controls Co., Ltd.

( * ) Notice: Subject to any disclaimer, the term of this patent is extended or adjusted under 35 U.S.C. 154(b) by 150 days.

(21) Appl. No.: 18/664,428

(22) Filed: May 15, 2024

(65) Prior Publication Data

US 2024/0387131 A1 Nov. 21, 2024

(30) Foreign Application Priority Data

May 18, 2023 (CN) ......................... 202310568112.6

(51) Int. Cl.
*H01H 50/18* (2006.01)
*H01H 50/54* (2006.01)

(52) U.S. Cl.
CPC ............ *H01H 50/18* (2013.01); *H01H 50/54* (2013.01)

(58) Field of Classification Search
CPC ................... H01H 50/18; H01H 50/24; H01H 50/643–644
USPC .......................................... 335/128–129, 201
See application file for complete search history.

(56) References Cited

U.S. PATENT DOCUMENTS 4,587,502 A 5/1986 Matsuo et al.
4,625,191 A 11/1986 Oberndorfer et al.
4,831,348 A 5/1989 Agatahama et al.
4,833,435 A 5/1989 Ohara
5,359,305 A * 10/1994 Kitamura ........... H01H 51/2227 335/83
6,046,661 A * 4/2000 Reger .................. H01H 50/643 335/185

(Continued)

FOREIGN PATENT DOCUMENTS

CN 203607342 U 5/2014
CN 105047482 A 11/2015

(Continued)

OTHER PUBLICATIONS

Notice of Allowance for Japanese Application No. 2024-081263.

(Continued)

*Primary Examiner* — Alexander Talpalatski
(74) *Attorney, Agent, or Firm* — Thomas Horstemeyer, LLP

(57) ABSTRACT

A relay includes a base, a contact part disposed on the base and including two sets of movable contact part, a push rod assembly including a first push rod and a second push rod respectively connected to two sets of movable contact parts, and a magnetic circuit part including a coil assembly and an armature assembly. The armature assembly is pivotally connected to the base around a pivot point, and includes a first driving end connected to the first push rod to form a first force point and a second driving end connected to the second push rod to form a second force point. The distance between the first force point and the pivot point is not equal to the distance between the second force point and the pivot point.

10 Claims, 11 Drawing Sheets

(56) References Cited

U.S. PATENT DOCUMENTS

| | | | | |
|---|---|---|---|---|
| 7,659,800 | B2 * | 2/2010 | Gruner | H01H 51/2281 335/185 |
| 8,159,321 | B2 | 4/2012 | Bollinger et al. | |
| 8,222,981 | B1 | 7/2012 | Zarbock et al. | |
| 9,484,172 | B2 | 11/2016 | Connell | |
| 9,548,173 | B2 * | 1/2017 | Connell | H01H 50/16 |
| 10,541,097 | B2 | 1/2020 | Hoffman | |
| 10,811,205 | B2 * | 10/2020 | Hayashida | H01H 51/2227 |
| 11,257,647 | B1 | 2/2022 | Liao | |
| 11,404,232 | B1 * | 8/2022 | Liao | H01H 51/2227 |
| 2006/0134955 | A1 | 6/2006 | Sasaki et al. | |
| 2009/0033446 | A1 * | 2/2009 | Gruner | H01H 51/2281 335/129 |
| 2010/0026427 | A1 | 2/2010 | Moeller et al. | |
| 2011/0048907 | A1 | 3/2011 | Moeller et al. | |
| 2012/0206222 | A1 | 8/2012 | Gruner | |
| 2013/0176017 | A1 * | 7/2013 | Connell | H01H 1/021 324/157 |
| 2013/0222084 | A1 | 8/2013 | Kato | |
| 2015/0228428 | A1 | 8/2015 | Connell | |
| 2018/0240631 | A1 | 8/2018 | Hayashida et al. | |
| 2019/0013172 | A1 | 1/2019 | Hayashida et al. | |
| 2019/0287749 | A1 | 9/2019 | Zhong et al. | |
| 2024/0387137 | A1 | 11/2024 | Dai et al. | |

FOREIGN PATENT DOCUMENTS

| | | | |
|---|---|---|---|
| CN | 105050675 | A | 11/2015 |
| CN | 106611682 | A | 5/2017 |
| CN | 106971913 | B | 9/2018 |
| CN | 214068646 | U | 8/2021 |
| CN | 113611575 | A | 11/2021 |
| CN | 219873341 | U | 10/2023 |
| EP | 2009665 | B1 | 9/2012 |
| EP | 2752862 | A1 | 7/2014 |
| EP | 2940704 | A1 | 11/2015 |
| EP | 3089190 | A1 | 11/2016 |
| EP | 3113204 | B1 | 10/2019 |
| EP | 3608938 | A1 | 2/2020 |
| EP | 3608938 | B1 | 3/2022 |
| EP | 4354479 | A1 | 4/2024 |
| JP | S61284022 | A | 12/1986 |
| JP | 2006-196362 | A | 7/2006 |
| JP | 2014-505345 | A | 2/2014 |
| JP | 2015-011932 | A | 1/2015 |
| JP | 2015-213069 | A | 11/2015 |
| JP | 2017-084657 | A | 5/2017 |
| JP | 2017-084659 | A | 5/2017 |
| JP | 6414019 | B2 | 10/2018 |
| JP | 2019-521493 | A | 7/2019 |
| JP | 6726156 | B2 | 6/2020 |
| JP | 2022-148778 | A | 10/2022 |
| JP | 2023-552892 | A | 12/2023 |
| KR | 10-2024-0166941 | A | 11/2024 |
| WO | 2018177428 | A1 | 10/2018 |
| WO | 2019026756 | A1 | 2/2019 |
| WO | 2022262851 | A1 | 12/2022 |

OTHER PUBLICATIONS

CN2023105682701—1st Office Action with English Translation mailed Aug. 1, 2025.

JP2024-080622—Notice of Allowance with English Translation mailed May 27, 2025.

JP2024-080623—Notice of Allowance with English Translation mailed May 7, 2025.

JP2024-080671—Notice of Allowance with English Translation mailed May 27, 2025.

KR10-2024-0064319—1st Office Action with English Translation mailed Jun. 29, 2025.

JP2024-079828—1st Office Action with English Translation mailed Jun. 3, 2025.

EP24176328.3—Extended European Search Report.

EP24176437.2—Extended European Search Report.

EP24176439.8—Extended European Search Report.

EP24176441.4—Extended European Search Repor.

EP24176447.1—Extended European Search Report.

EP24176378.8—Extended European Search Report.

Korean Notice of Allowance for Application No. 10-2024-0064319.

United States Non-Final Office Action for U.S. Appl. No. 18/664,422.

United States Non-Final Office Action for U.S. Appl. No. 18/664,436.

United States Non-Final Office Action for U.S. Appl. No. 18/668,120.

* cited by examiner

RELAY

CROSS REFERENCE

This application is based upon and claims priority to Chinese Patent Application No. 202310568112.6, filed on May 18, 2023, the entire contents thereof are incorporated herein by reference.

TECHNICAL FIELD

The present disclosure relates to the field of electronic control device technology, specifically to a relay.

BACKGROUND

A relay is an electronic control device that has a control system (also known as an input circuit) and a controlled system (also known as an output circuit), and is typically used in automatic control circuits. Essentially, the relay is an "automatic switch" that uses a smaller current to control a larger current. Therefore, it plays roles such as automatic regulation, safety protection, and circuit switching in electrical circuits.

The relay includes a magnetic circuit part, a push rod assembly, and a contact part. The magnetic circuit part includes a coil assembly and an armature assembly. The coil assembly is used to drive the movement of the armature assembly, and then drive the contacts of the contact part to connect or disconnect through the push rod assembly.

However, in existing technology, utilization rate of a magnetic driving force generated by the coil assembly after being energized is not high, and it cannot be differentiated for different contact conditions.

SUMMARY

A relay according to the embodiment of the present disclosure, includes:

- a base;
- a contact part disposed on the base and including two sets of movable contact parts, each set of the movable contact parts including a movable contact unit and a static contact unit; two movable contact units of the contact part corresponding to two static contact units of the contact part, respectively;
- a push rod assembly including a first push rod and a second push rod, the first push rod and the second push rod being connected to the two sets of movable contact parts, respectively; and
- a magnetic circuit part including a coil assembly and an armature assembly, the armature assembly being pivotally connected to the base around a pivot point, the coil assembly being used to drive the armature assembly to swing relative to the base;
- wherein the armature assembly includes a first driving end and a second driving end, the first driving end is connected to the first push rod to form a first force point, and the second driving end is connected to the second push rod to form a second force point; and a distance between the first force point and the pivot point is not equal to a distance between the second force point and the pivot point.

According to some embodiments of the present disclosure, when the contact part is in a disconnected state, a contact gap between the movable contact unit and the static contact unit corresponding to each other in one set is smaller than a contact gap between the movable contact unit and the static contact unit corresponding to each other in the other set; the movable contact unit and the static contact unit in one set with a smaller contact gap is defined as an arc-resistant end contact, and movable contact unit and the static contact unit in the other set with a larger contact gap is defined as a current-carrying end contact;

- the first push rod is configured to drive the movable contact unit and the static contact unit of the current-carrying end contact to connect or disconnect, and the second push rod is configured to drive the movable contact unit and the static contact unit of the arc-resistant end contact to connect or disconnect; and
- a distance between the first force point and the pivot point is greater than a distance between the second force point and the pivot point.

According to some embodiments of the present disclosure, wherein the movable contact unit includes one or more movable contacts, the static contact unit includes one or more static contacts, and the movable contacts and static contacts corresponding to each other form a contact set; the arc-resistant end contact includes one or more contact sets, and the current-carrying end contact includes one or more contact sets;

- a number of the contact sets of the arc-resistant end contact is less than or equal to a number of the contact sets of the current-carrying end contact.

According to some embodiments of the present disclosure, wherein the arc-resistant end contact includes one or two contact sets; and

- the current-carrying end contact includes two or three contact sets.

According to some embodiments of the present disclosure, the arc-resistant end contact includes two contact sets, and the two contact sets are arranged side by side in a width direction of the movable contact part;

- the current-carrying end contact includes two or three contact sets, and the two or three contact sets are arranged side by side in the width direction of the movable contact part.

According to some embodiments of the present disclosure, each set of movable contact parts further includes a movable contact piece and a movable contact leading-out piece, the movable contact leading-out piece is connected to the movable contact piece; wherein the first push rod and the second push rod are connected to the two movable contact pieces in the contact part, respectively;

- the movable contact unit is disposed on the movable contact piece, and the static contact unit is disposed at a connection position between the movable contact piece and the movable contact leading-out piece.

According to some embodiments of the present disclosure, the movable contact piece includes a plurality of sub-contact pieces stacked with each other.

According to some embodiments of the present disclosure, the movable contact piece has opposite first and second ends in its own length direction;

- the movable contact unit is disposed at the first end, and the second end is connected to the movable contact leading-out piece.

According to some embodiments of the present disclosure, the first push rod and the second push rod are located on opposite sides of the armature assembly.

According to some embodiments of the present disclosure, the armature assembly includes a permanent magnet, an armature, and a swinging arm, the permanent magnet, the armature, and the swinging arm are connected as a whole by injection molding;

the two ends of the swinging arm are the first driving end and the second driving end.

Figure 1:
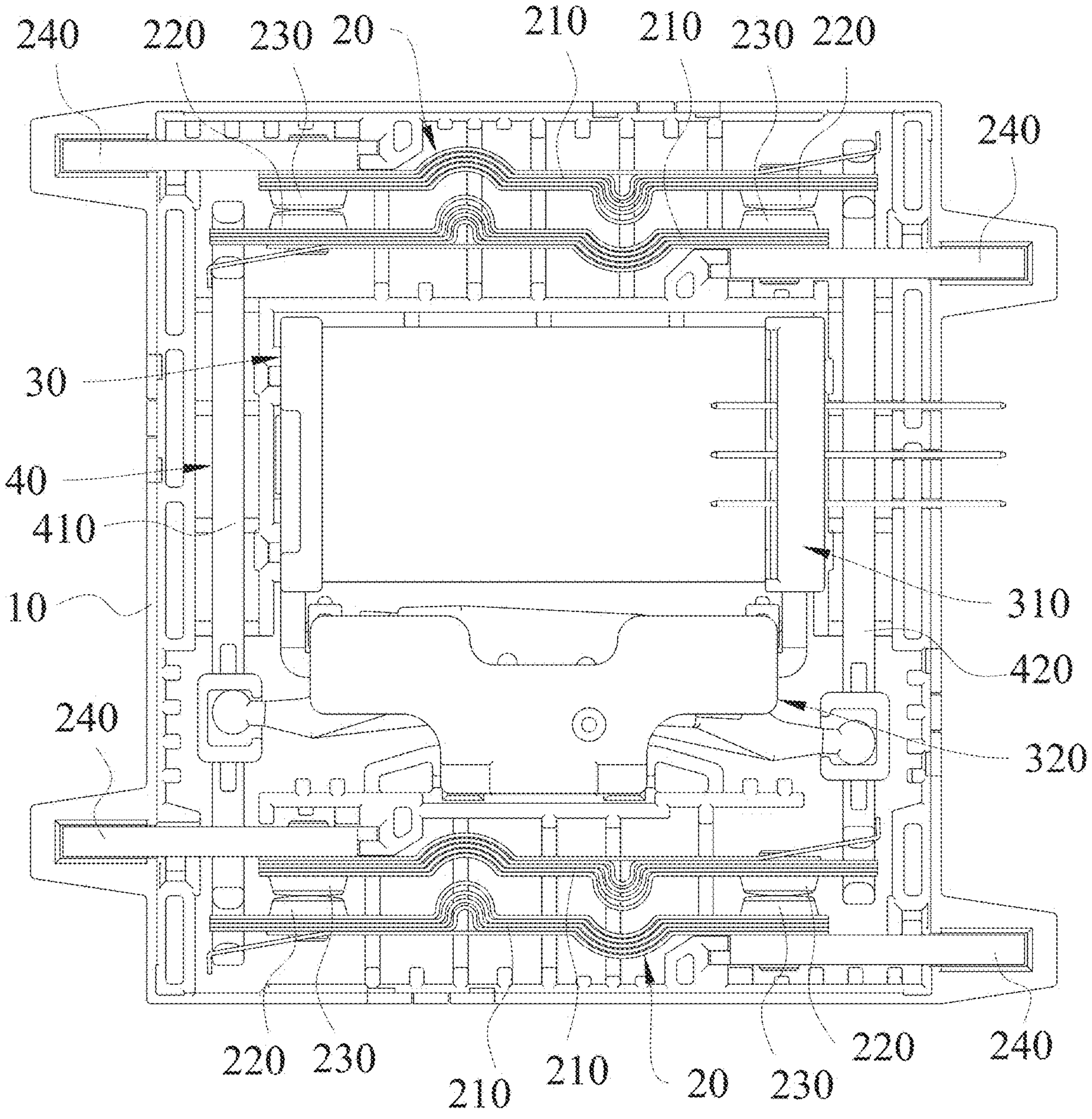
FIG. 1 illustrates a top schematic view of a relay according to an embodiment of the present disclosure, with the upper cover omitted.

wherein, the reference numerals are listed as follows:

10: base
20: contact part
20*a*: movable contact part
210: movable contact piece
211: sub-contact piece
212: current carrier
213: end face
214: slit
210*a*: first end
210*b*: second end
220: movable contact unit
221: movable contact
230: static contact unit
231: static contact
240: movable contact leading-out piece
250: arc-resistant end contact
260: current-carrying end contact
30: magnetic circuit part
310: coil assembly
320: armature assembly
321: permanent magnet
322: armature
323: swinging arm
324: first driving end
325: second driving end
40: push rod assembly
410: first push rod
420: second push rod
O: pivot point
O1: first force point
O2: second force point
D1: length direction
D2: width direction

DETAILED DESCRIPTION

Now, the exemplary implementations will be described more completely with reference to the accompanying drawings. However, the exemplary implementations can be done in various forms and should not be construed as limiting the implementations as set forth herein. Instead, these implementations are provided so that the present disclosure will be thorough and complete, and concept of the exemplary implementation will be fully conveyed to those skilled in the art. Same reference numbers denote the same or similar structures in the figures, and thus the detailed description thereof will be omitted.

Figure 2:
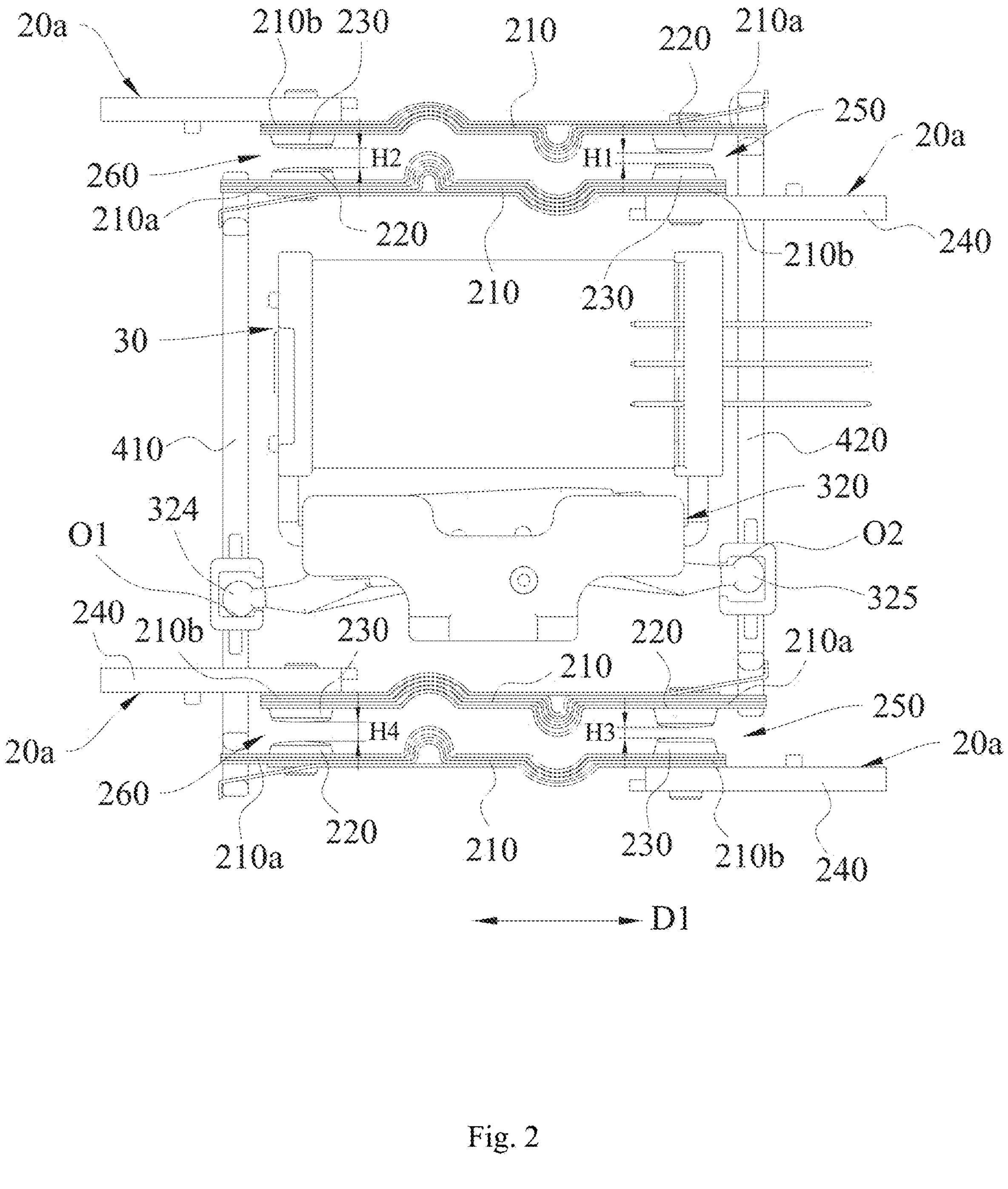
FIG. 2 shows a schematic view of the relay of FIG. 1 with the base omitted, and the contact part in a disconnected state.

As shown in FIGS. 1 and 2, a relay according to the embodiments of the present disclosure includes a base 10, a pair of contact parts 20, a magnetic circuit part 30, and a push rod assembly 40. The pair of contact parts 20 and the magnetic circuit part 30 are disposed on the base 10 The magnetic circuit part 30 drives contacts of the pair of contact parts 20 to connect or disconnect through the push rod assembly 40.

It is understood that the terms "include" and "have" and their any variations used in the embodiments of the present disclosure are intended to cover non-exclusive inclusions. For example, a process, method, system, product, or apparatus that includes a series of steps or units is not limited to the listed steps or units, but may optionally include steps or units not listed, or may optionally include other inherent steps or components for these processes, methods, products, or apparatuses.

In one embodiment, the base 10 may be substantially cubic in shape, but is not limited thereto.

A pair of contact parts 20 may be respectively disposed on two opposite sides of the magnetic circuit part 30. Of course, the pair of the contact parts 20 may also be disposed on the same side of the magnetic circuit part 30.

Each contact part 20 includes two sets of movable contact parts 20*a*. Each set of movable contact parts 20*a* includes a movable contact piece 210, a movable contact unit 220, a static contact unit 230, and a movable contact leading-out piece 240. The movable contact piece 210 is connected to the movable contact leading-out piece 240. The movable contact unit 220 is disposed on the movable contact piece 210, and the static contact unit 230 is disposed on the movable contact piece 210 and/or the movable contact leading-out piece 240. Two movable contact units 220 of each contact part 20 correspond to two static contact units 230 of each contact part 20, respectively.

The magnetic circuit part 30 is disposed on the base 10 and is used to drive the movement of four movable contact pieces 210 of the pair of contact parts 20 through the push rod assembly 40, thereby connecting and disconnecting the movable contact units 220 and the static contact units 230.

It is understood that the relay of the embodiments of the present disclosure includes a pair of contact parts 20. Each contact part 20 can control one circuit, so that the relay of the embodiments of the present disclosure can control at least two circuits.

Of course, in other embodiments, the relay may include only one contact part 20, which can control one circuit, thereby enabling the relay to control one circuit.

When the contact part 20 is in a disconnected state, a contact gap between the corresponding movable contact unit 220 and static contact unit 230 in one set is smaller than a contact gap between the corresponding movable contact unit 220 and static contact unit 230 in the other set.

As shown in FIG. 2, for the contact part 20 located above the magnetic circuit part 30, the contact gap between the movable contact unit 220 and the static contact unit 230 on the left side is H2, and the contact gap between the movable contact unit 220 and the static contact unit 230 on the right side is H1, where H1<H2.

Similarly, for the contact part 20 located below the magnetic circuit part 30, a contact gap between the movable contact unit 220 and the static contact unit 230 on the right side is H3, and the contact gap between the movable contact unit 220 and the static contact unit 230 on the left side is H4, where H3<H4.

It should be added that the design of different contact gaps between the two sets of movable contact units 220 and static contact units 230 can be achieved by reducing height of the contacts. Specifically, as shown in FIG. 2, taking the contact part 20 located above the magnetic circuit part 30 as an example, a contact height of the movable contact unit 220 and the static contact unit 230 on the left side is smaller than a contact height of the movable contact unit 220 and the static contact unit 230 on the right side, so that when the contact part 20 is in the disconnected state, due to the smaller contact height on the left side compared to the right side, the contact gap between the movable contact unit 220 and the static contact unit 230 on the left side is larger, and greater than the contact gap on the right side.

Of course, the design of different contact gaps can also be achieved by other methods, which are not listed one by one here, as long as it is possible to have different contact gaps between the two sets of movable contact units 220 and static contact units 230 when the contact part 20 is in the disconnected state, all of which are within the scope of protection of the present disclosure.

It is understood that in the contact part 20 of the embodiments of the present disclosure, since the contact gaps between the two sets of movable contact units 220 and static contact units 230 are different when in the disconnected state, during the transition from a connected state to a disconnected state, the set of the movable contact unit 220 and the static contact unit 230 with the larger contact gap therebetween will be disconnected prior to the set of the movable contact unit 220 and the static contact unit 230 with the smaller contact gap. At the moment when the set of the movable contact unit 220 and the static contact unit 230 with the larger contact gap has just disconnected, the set of the movable contact unit 220 and the static contact unit 230 with the smaller contact gap has not yet fully disconnected. Therefore, the set of the movable contact unit 220 and the static contact unit 230 with the larger contact gap plays a current-carrying role, while the set of the movable contact unit 220 and the static contact unit 230 with the smaller contact gap plays an arc-resistant role. Since the set of the movable contact unit 220 and the static contact unit 230 with the larger contact gap does not produce an arc when disconnecting. Therefore, only the set of the movable contact unit 220 and the static contact unit 230 with the smaller contact gap needs to be controlled for the contact parameters of the entire contact part 20, without considering the set of the movable contact unit 220 and the static contact unit 230 with the larger contact gap. Compared to the multi-contact design in the existing technology, the contact parameters of the contact part 20 of the embodiments of the present disclosure are easier to control and simpler to process, which is beneficial for improving production efficiency.

As an example, in each set of movable contact parts 20*a*, the static contact unit 230 is disposed at a connection position between the movable contact piece 210 and the movable contact leading-out piece 240.

As shown in FIGS. 1 and 2, the movable contact piece 210 has a first end 210*a* and a second end 210*b* opposite to each other along its own length direction D1. The movable contact unit 220 is disposed at the first end 210*a*, and the static contact unit 230 is disposed at the second end 210*b*. Moreover, the second end 210*b* of the movable contact piece 210 is connected to the movable contact leading-out piece 240, so that the static contact unit 230 is disposed at a connection position between the second end 210*b* of the movable contact piece 210 and the movable contact leading-out piece 240.

In the contact part 20, two movable contact pieces 210 are parallel with each other. The movable contact unit 220 at the first end 210*a* of one of the movable contact pieces 210 corresponds to the static contact unit 230 at the second end 210*b* of the other of the movable contact pieces 210, such that two pairs of the movable contact units 220 and the static contact units 230 after contacting form a circuit structure in parallel. The design of the contact part 20 as a parallel circuit structure can effectively reduce a temperature rise.

As shown in FIGS. 1 and 2, the push rod assembly 40 includes a first push rod 410 and a second push rod 420, which are respectively disposed on the other two opposite sides of the magnetic circuit part 30. The magnetic circuit part 30 is drivably connected with the first push rod 410 and the second push rod 420, respectively, so as to drive the first push rod 410 and the second push rod 420 to reciprocate.

One end of the first push rod 410 is connected to the first end 210*a* of one of the movable contact pieces 210 in one of the contact parts 20, and the other end of the first push rod 410 is connected to the first end 210*a* of the other of the movable contact pieces 210 in the other of the contact parts 20. The one end of the second push rod 420 is connected to the first end 210*a* of the other of the movable contact pieces 210 in one of the contact parts 20, and the other end of the second push rod 420 is connected to the first end 210*a* of the other of the movable contact pieces 210 in the other of the contact parts 20.

In this embodiment, the push rod assembly 40 adopts a dual push rod structure with the first push rod 410 and the second push rod 420, and the connecting or disconnecting of the contacts can be achieved through the push-pull movement of the dual push rod structure.

Specifically, as shown in FIG. 2, the movement directions of the first push rod 410 and the second push rod 420 are opposite. If the first push rod 410 moves downwards, then the second push rod 420 moves upwards. Since the first push rod 410 moves downwards, the two movable contact pieces 210 connected to the first push rod 410 both pivot downwards around their respective second ends 210*b*. Since the second push rod 420 moves upwards, the two movable contact pieces 210 connected to the second push rod 420 both pivot upwards around their respective second ends 210*b*. In one contact part 20, the two movable contact pieces 210 pivot in opposite directions and move away from each other, thereby achieving the disconnection of the movable contact unit 220 and the static contact unit 230.

Conversely, if the first push rod 410 moves upwards, then the second push rod 420 moves downwards. The two movable contact pieces 210 connected to the first push rod 410 both pivot upwards around their respective second ends 210*b*, and the two movable contact pieces 210 connected to the second push rod 420 both pivot downwards around their respective second ends 210*b*. In one contact part 20, the two movable contact pieces 210 pivot in opposite directions and move towards each other, achieving the connection of the movable contact unit 220 and the static contact unit 230.

Figure 3:
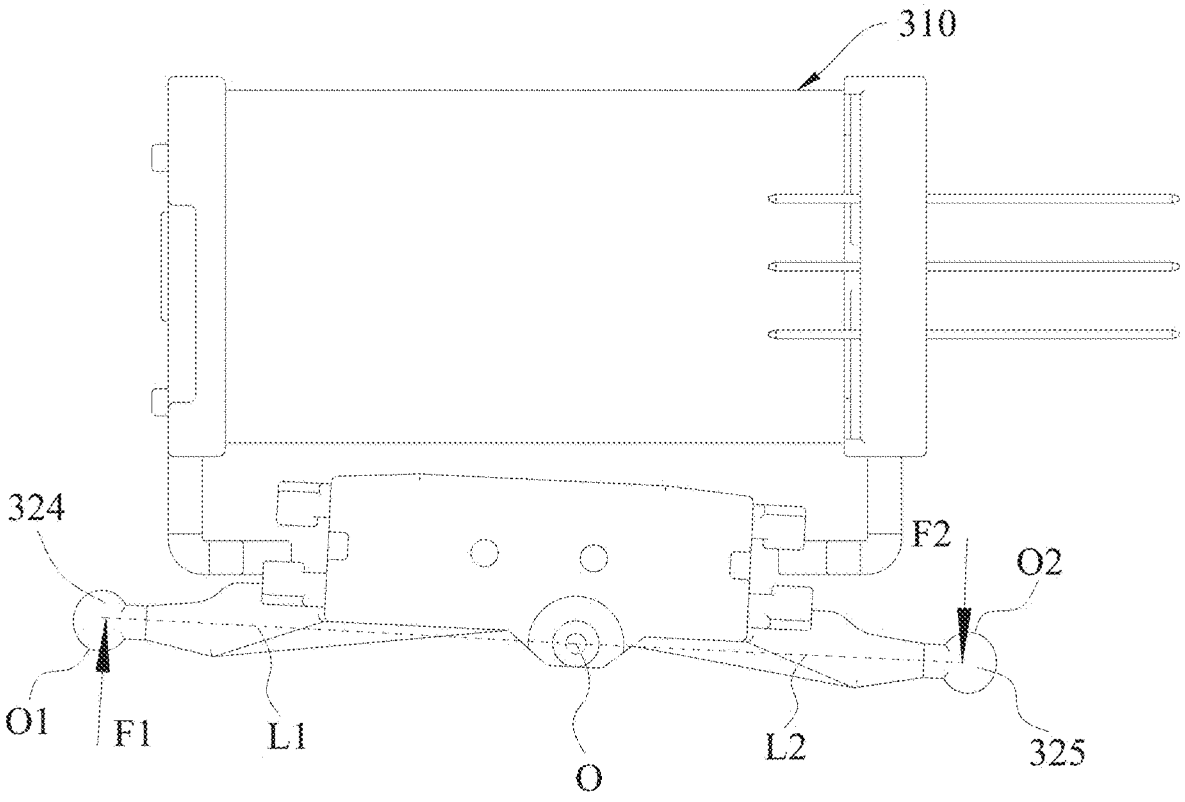
FIG. 3 shows a schematic view of the magnetic circuit part.
Figure 4:
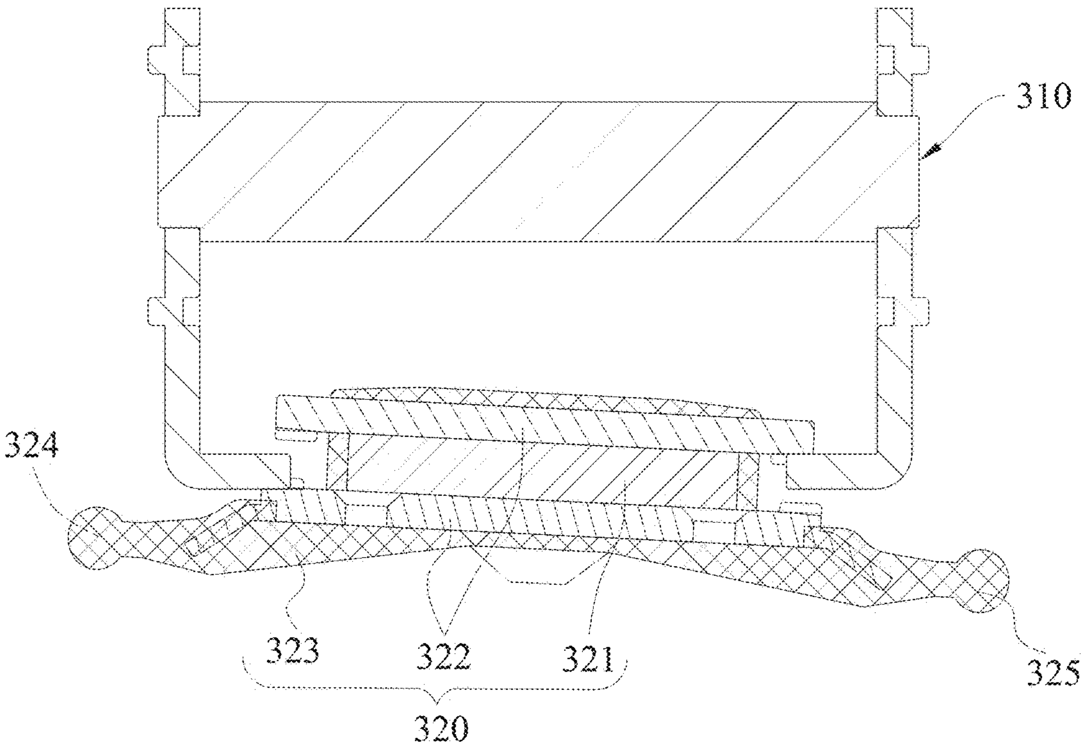
FIG. 4 shows a cross-sectional view of the magnetic circuit part.

As shown in FIGS. 2 to 4, the magnetic circuit part 30 includes a coil assembly 310 and an armature assembly 320, the armature assembly 320 is pivotally connected to the base 10 about a pivot point O. The coil assembly 310 is used to drive the armature assembly 320 to pivot relative to the base 10 about the pivot point O. The armature assembly 320 includes a permanent magnet 321, an armature 322, and a swinging arm 323. There are two armatures 322, and the permanent magnet 321 is clamped between the two armatures 322. The swinging arm 323 may be made of an insulating material, such as plastic. The permanent magnet 321, the armature 322, and the swinging arm 323 may be integrally connected by an injection molding. The swinging arm 323 has a first driving end 324 and a second driving end 325, the first driving end 324 is connected to the first push rod 410 and forms a first force point O1, and the second driving end 325 is connected to the second push rod 420 and forms a second force point O2.

By changing a direction of a magnetic field of the coil assembly 310 to drive the armature assembly 320 to pivot relative to the base 10. The first driving end 324 and the second driving end 325 of the swinging arm 323 of the armature assembly 320 respectively drive the reciprocated movement of the first push rod 410 and the second push rod 420, so as to achieve the connection or disconnection of the movable contact unit 220 and the static contact unit 230.

In conjunction of FIGS. 2 and 3, a distance between the first force point O1 and the pivot point O is L1, and a distance between the second force point O2 and the pivot point O is L2, where L1 and L2 are unequal.

It can be understood that the coil assembly 310, after being energized, can drive the armature assembly 320 to pivot relative to the base 10. For example, when the coil assembly 310 passes a positive current, the armature assembly 320 pivots clockwise about the pivot point O; when the coil assembly 310 passes a negative current, the armature assembly 320 pivots counterclockwise about the pivot point O.

It is required that a coil driving force generated by the energized coil assembly overcomes a magnetic holding force of the permanent magnet 321 and elastic forces of the two movable contact pieces 210 connected to the first push rod 410 and the second push rod 420, respectively. Only when the coil driving force is greater than a sum of the magnetic holding force and the elastic forces, can the armature assembly 320 pivot about the pivot point O.

The coil driving force generated by the energized coil assembly 310 is F, the magnetic holding force generated by the permanent magnet 321 is e, a force of the first driving end 324 required to overcome the elastic force of one of the movable contact pieces 210 is F1, and a force of the second driving end required to overcome the elastic force of the other movable contact piece 210 is F2. Then, if the armature assembly 320 pivots clockwise about the pivot point O in FIG. 3, the following equation must be satisfied:

$$F=F1*L1+F2*L2+e;$$

As mentioned above, since L1 and L2 are unequal, F1 and F2 are also unequal. Therefore, the driving force of the first push rod 410 acting on one of the movable contact pieces 210 is not equal to the driving force of the second push rod 420 acting on the other of the movable contact pieces 210.

As can be seen, the relay of the embodiments of the present disclosure, by eccentrically setting the armature assembly 320, makes the distance L1 from the first force point O1 formed by the armature assembly 320 and the first push rod 410 to the pivot point O not equal to the distance L2 from the second force point O2 formed by the armature assembly 320 and the second push rod 420 to the pivot point O. In this way, under the condition that the coil driving force generated by the coil assembly 310 remains unchanged, it is possible for the first push rod 410 and the second push rod 420 to apply different driving forces on the two movable contact parts 20*a*, and then it is possible to differentiate the driving forces of the two push rods according to different contact conditions, thereby improving the utilization rate of the overall coil driving force.

The set of the movable contact unit 220 and the static contact unit 230 with a smaller contact gap is defined as an arc-resistant end contact 250, and the set of the movable contact unit 220 and the static contact unit 230 with a larger contact gap is defined as a current-carrying end contact 260. The first push rod 410 is used to drive the movable contact unit and the static contact unit of the current-carrying end 260 to connect or disconnect, and the second push rod 420 is used to drive the movable contact unit and the static contact unit of the arc-resistant end contact 250 to connect or disconnect. The distance L1 between the first force point O1 and the pivot point O is greater than the distance L2 between the second force point O2 and the pivot point O, i.e., L1>L2.

It should be noted that since the contact gap between the arc-resistant end contact 250 is smaller, it is prone to generate an adhesion force when the contacts are disconnected, which may cause the relay to fail to disconnect reliably. Therefore, compared to the current-carrying end contact 260, the arc-resistant end contact 250 requires a greater driving force to achieve reliable disconnection.

In this embodiment, due to L1>L2, it can be concluded from the equation F=F1*L1+F2*L2+e that F1<F2, i.e., a breaking driving force of the second push rod 420 acting on the arc-resistant end contact 250 is greater than a breaking driving force of the first push rod 410 acting on the current-carrying end contact 260. In this way, the relay of the embodiments of the present disclosure has both advantages of being easy to control the parameters of the arc-resistant end contact 250 without considering the parameters of the current-carrying end contact 260, and improving the reliability of breaking the arc-resistant end contact 250.

As shown in FIG. 2, in the contact part 20 located above the magnetic circuit part 30, the movable contact unit 220 and the static contact unit 230 on the right side are defined as the arc-resistant end contact 250, and the movable contact unit 220 and the static contact unit 230 on the left side are defined as the current-carrying end contact 260; in the contact part 20 located below the magnetic circuit part 30, the movable contact unit 220 and the static contact unit 230 on the right side are defined as the arc-resistant end contact

250, and the movable contact unit 220 and the static contact unit 230 on the left side are defined as the current-carrying end contact 260.

Two ends of the first push rod 410 respectively correspond to two current-carrying end contacts 260, and the two ends of the second push rod 420 respectively correspond to two arc-resistant end contacts 250.

Figure 5:
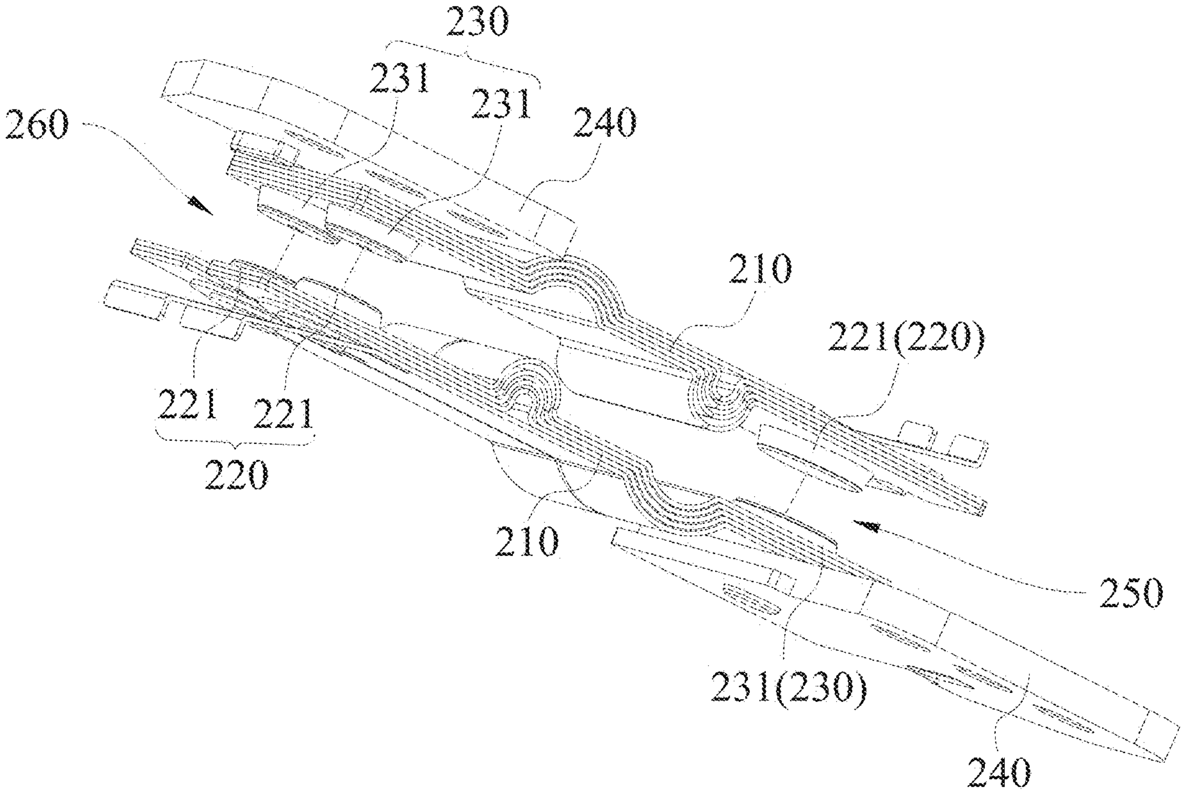
FIG. 5 shows a three-dimensional schematic view of the contact part according to a first embodiment of the present disclosure.
Figure 6:
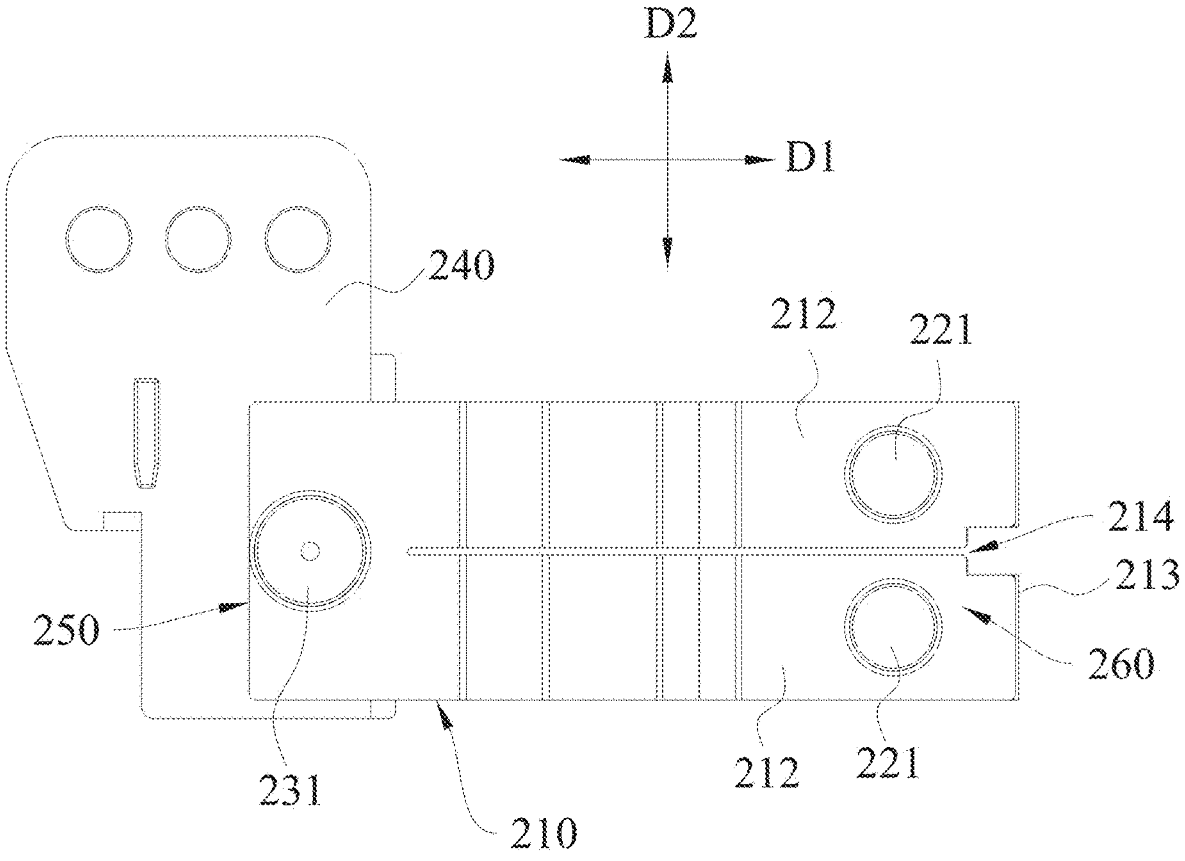
FIG. 6 shows a top schematic view of one of the movable contact parts in the contact part according to the first embodiment of the present disclosure.

As shown in FIGS. 5 and 6, the movable contact unit 220 includes one or more movable contacts 221, and the static contact unit 230 includes one or more static contacts 231. The movable contact 221 and the static contact 231 corresponding to each other form a contact set. The arc-resistant end contact 250 includes one or more contact sets. The current-carrying end contact 260 includes one or more contact sets. The number of the contact sets in the arc-resistant end contacts 250 is less than or equal to the number of contact sets in the current-carrying end contact 260.

In this embodiment, both the arc-resistant end contact 250 and the current-carrying end contact 260 may respectively be configured to include a plurality of contact sets, such that a parallel structure formed by the plurality of contact sets can further reduce a temperature rise of the relay. Moreover, since the current-carrying end contact 260 plays a current-carrying role and the arc-resistant end contact 250 plays an arc-resistant role, the number of the contact sets in the arc-resistant end contact 250 is designed to be less than or equal to the number of the contact sets in the current-carrying end contact 260. This not only increases the number of the contact sets in the current-carrying end contact 260 to reduce the temperature rise but also controls the number of the contact sets in the arc-resistant end contact 250, facilitating the management of contact parameters, ultimately achieving a situation where the increase in the contact sets does not affect the management of the contact parameters.

As shown in FIGS. 5 and 6, in the embodiments of the present disclosure, the contact part 20 includes three sets of contact sets, among which the number of contact sets of the arc-resistant end contact 250 is 1, and the number of contact sets of the current-carrying end contact 260 is 2. The two contact sets of the current-carrying end contact 260 are arranged side by side along a width direction D2 of the movable contact piece 210.

Please continue to refer to FIG. 6, along the width direction D2 of the movable contact piece 210, a slit 214 is provided between the two movable contacts 221 adjacent to each other on the movable contact piece 210. Furthermore, along a length direction D1 of the movable contact piece 210, one end of the slit 214 penetrates through an end face 213 of the movable contact piece 210, and the other end of the slit 214 extends to the static contact 231 on the movable contact piece 210.

In this embodiment, by providing a slit 214 on the movable contact piece 210, the movable contact piece 210 is divided into a plurality of current carriers 212 by the slit 214. The movable contacts 221 on the movable contact piece 210 are provided correspondingly on the plurality of current carriers 212. Thus, the movable contacts 221 on the movable contact piece 210 can move relatively independently, enabling the movable contacts 221 to reliably contact the static contact 231, avoiding a situation where some of the movable contacts 221 on the movable contact piece 210 have already contacted the static contact 231, while the other movable contacts 221 have not yet contacted the static contact 231, thereby improving contact reliability of the contacts.

Of course, in other embodiments, a slit 214 may not be provided on the movable contact piece 210.

Figure 7:
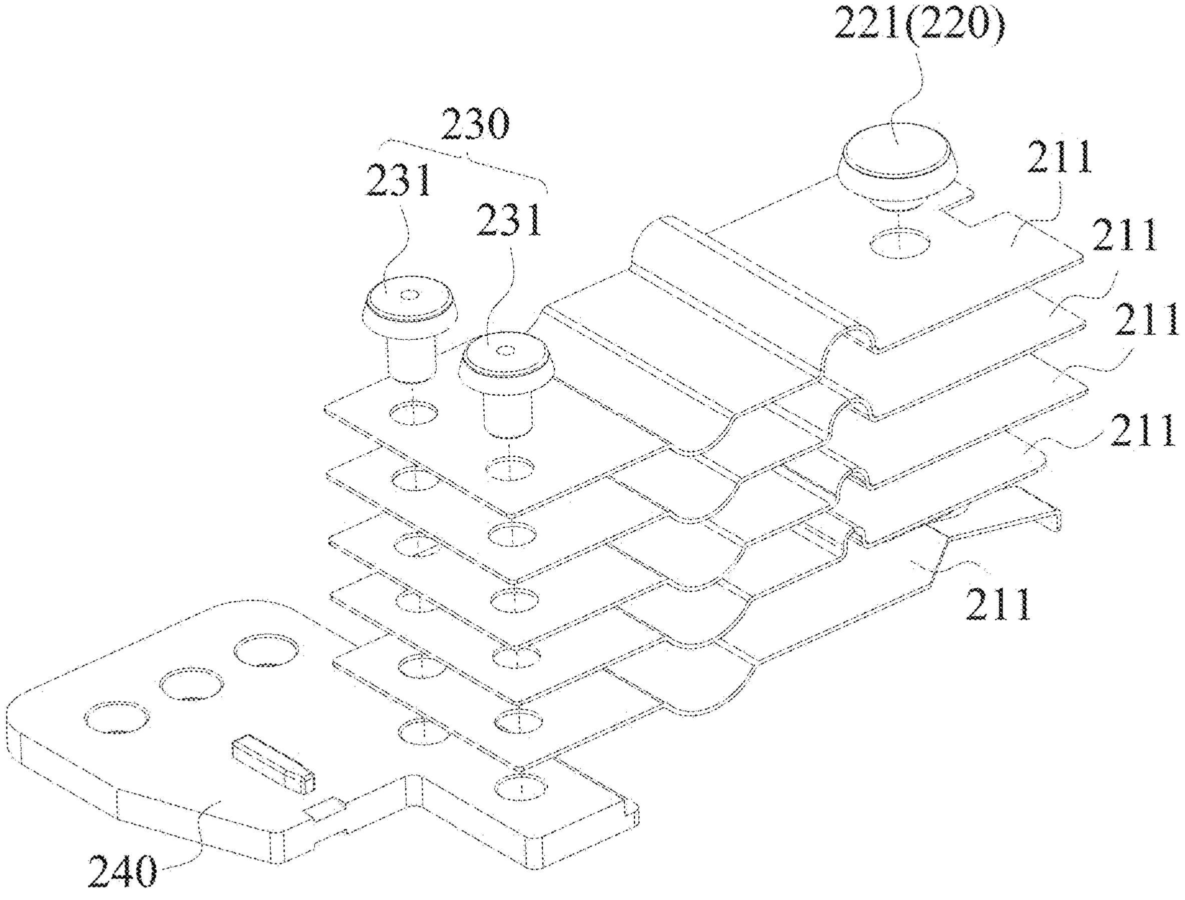
FIG. 7 shows an exploded schematic view of one of the movable contact parts in the contact part according to the first embodiment of the present disclosure, where the movable contact piece is not provided with a slit.

As shown in FIG. 7, the movable contact piece 210 includes a plurality of sub-contact pieces 211 stacked with each other. In the embodiments of the present disclosure, the number of sub-contact pieces 211 is five, but this is not limited thereto, for example, the number of sub-contact pieces 211 may also be two, three, four, six, or others. By designing the movable contact piece 210 to include a plurality of sub-contact pieces 211 stacked with each other, on the one hand, the thickness of the sub-contact pieces 211 is thin, and the movable contact piece 210 can be made of a thin strip material with lower material cost and easier operation; on the other hand, the number of sub-contact pieces 211 can be flexibly adjusted according to the current, that is, the thickness of the movable contact piece 210 can be increased or decreased.

The movable contacts 221 and the static contacts 231 are provided on the movable contact pieces 210. It can be understood that the movable contacts 221 may be connected to the movable contact pieces 210 in an integral or separate manner, and the static contacts 231 can also be connected to the movable contact pieces 210 in an integral or separate manner.

When the movable contacts 221 and the static contacts 231 are connected to the movable contact pieces 210 in the separate manner, the connection method may be riveting, but this is not limited thereto.

Of course, in other embodiments, the movable contact pieces 210 may also be an integral piece, without the multi-layer sub-contact pieces 211 stacked with each other.

Figure 8:
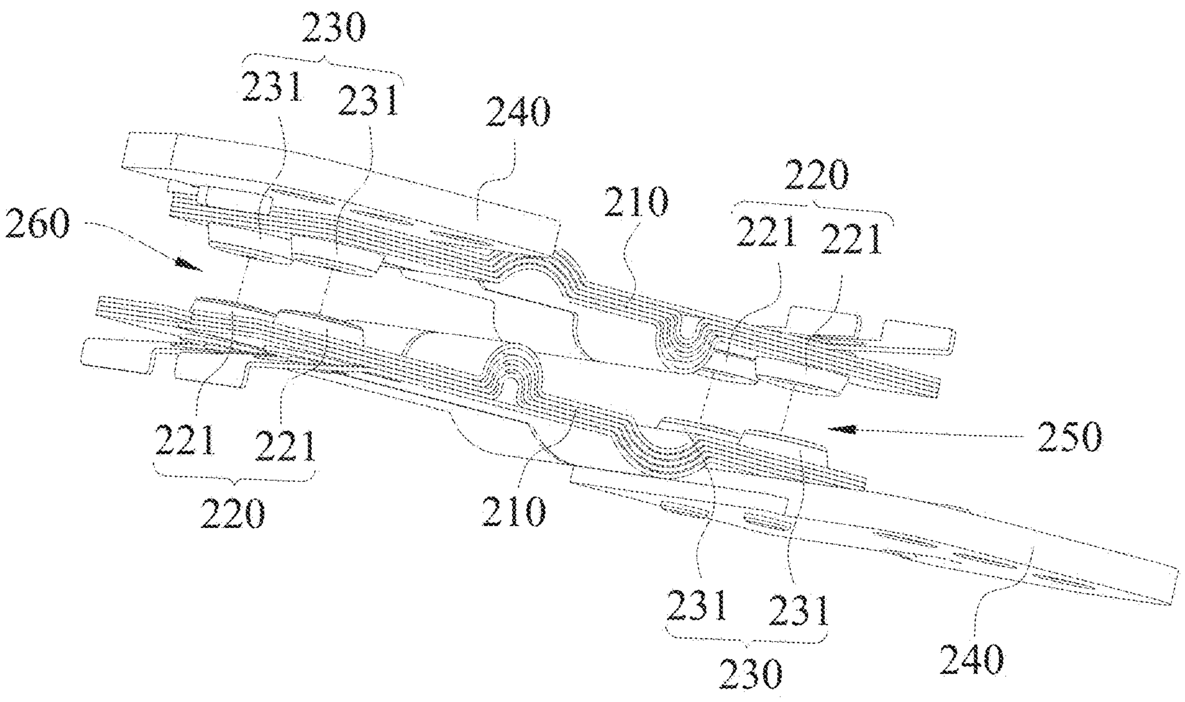
FIG. 8 shows a three-dimensional schematic view of the contact part according to a second embodiment of the present disclosure.
Figure 9:
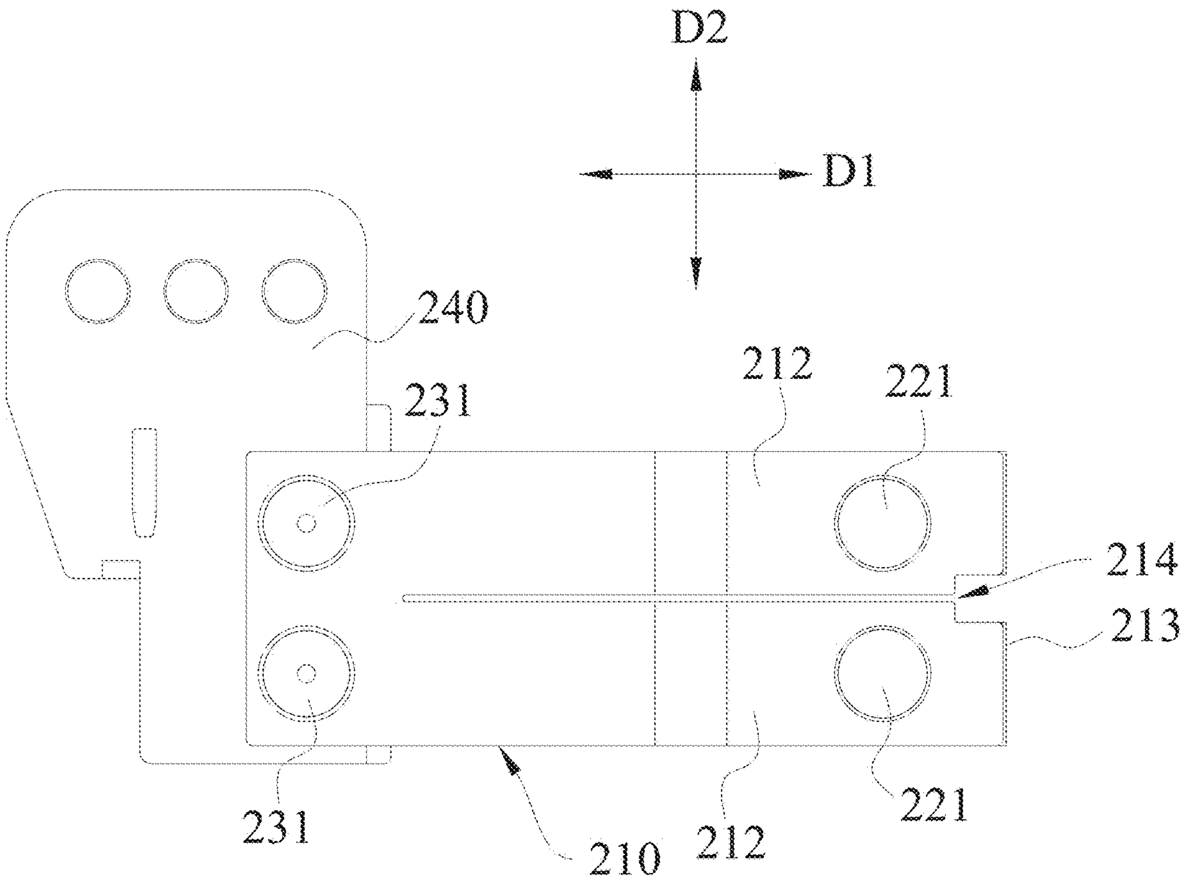
FIG. 9 shows a top schematic view of one of the movable contact parts in the contact part according to the second embodiment of the present disclosure.
Figure 10:
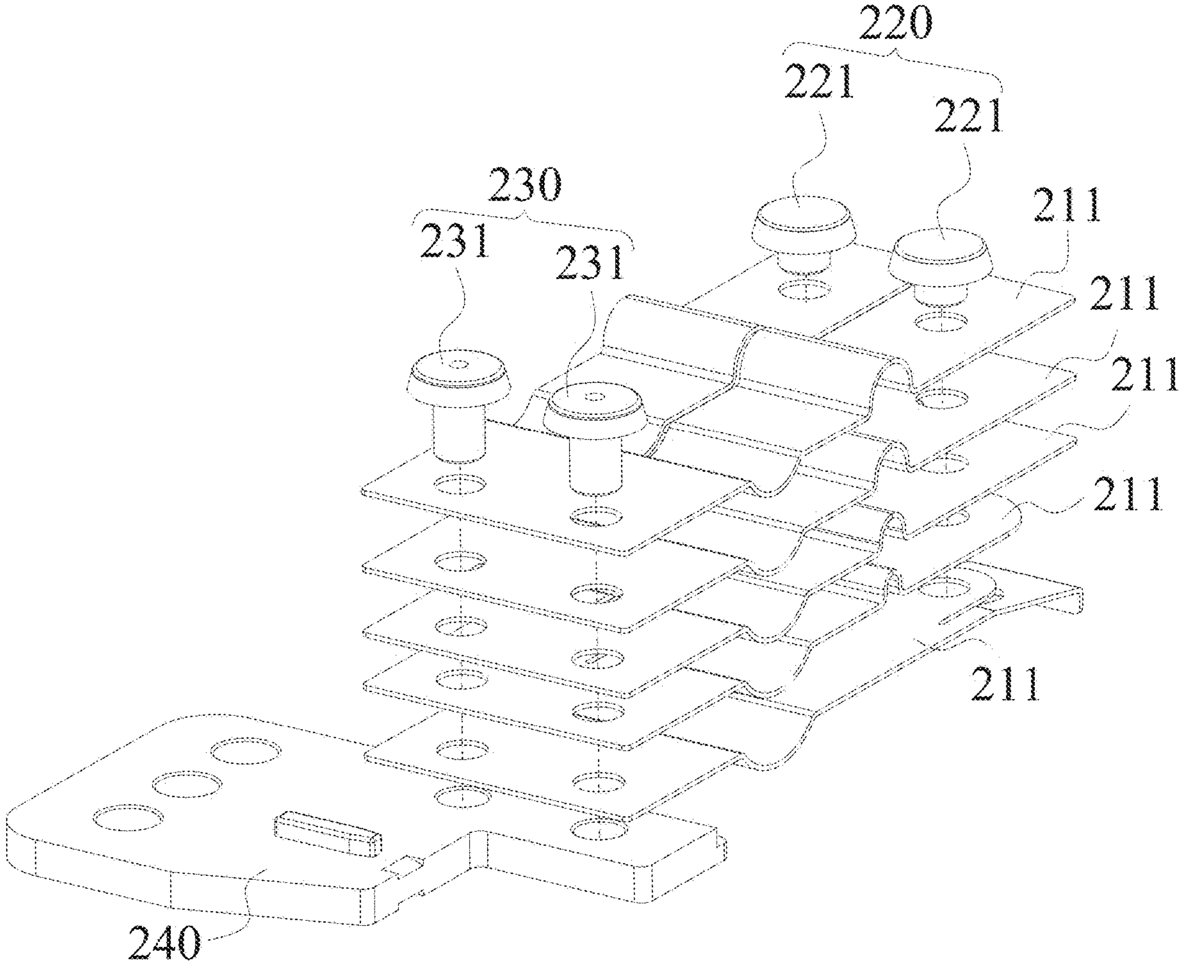
FIG. 10 shows an exploded schematic view of one of the movable contact parts in the contact part according to the second embodiment of the present disclosure, where the movable contact piece is provided with a slit.

As shown in FIGS. 8 to 10, compared to the contact part 20 of the first embodiment, the contact part 20 of the second embodiment has a substantially similar structure in the basic configuration. Therefore, in the following description of the contact part 20 of the second embodiment, the structures already described in the first embodiment will not be repeated. In addition, the structures in the contact part 20 of the second embodiment that are the same as those described in the first embodiment will be denoted by the same reference numerals. Therefore, in the following description of the present embodiment, the differences between the contact part 20 of the second embodiment and the contact part 20 of the first embodiment will be mainly described.

In this embodiment, the contact part 20 includes four sets of contacts, among which the number of contact sets of the arc-resistant end contact 250 is 2, and the number of contact sets of the current-carrying end contact 260 is 2. The two contact sets of the arc-resistant end contact 250 and the two contact sets of the current-carrying end contact 260 are respectively arranged along the width direction D2 of the movable contact piece 210.

The movable contact piece 210 may be provided with a slit 214, or not.

Figure 11:
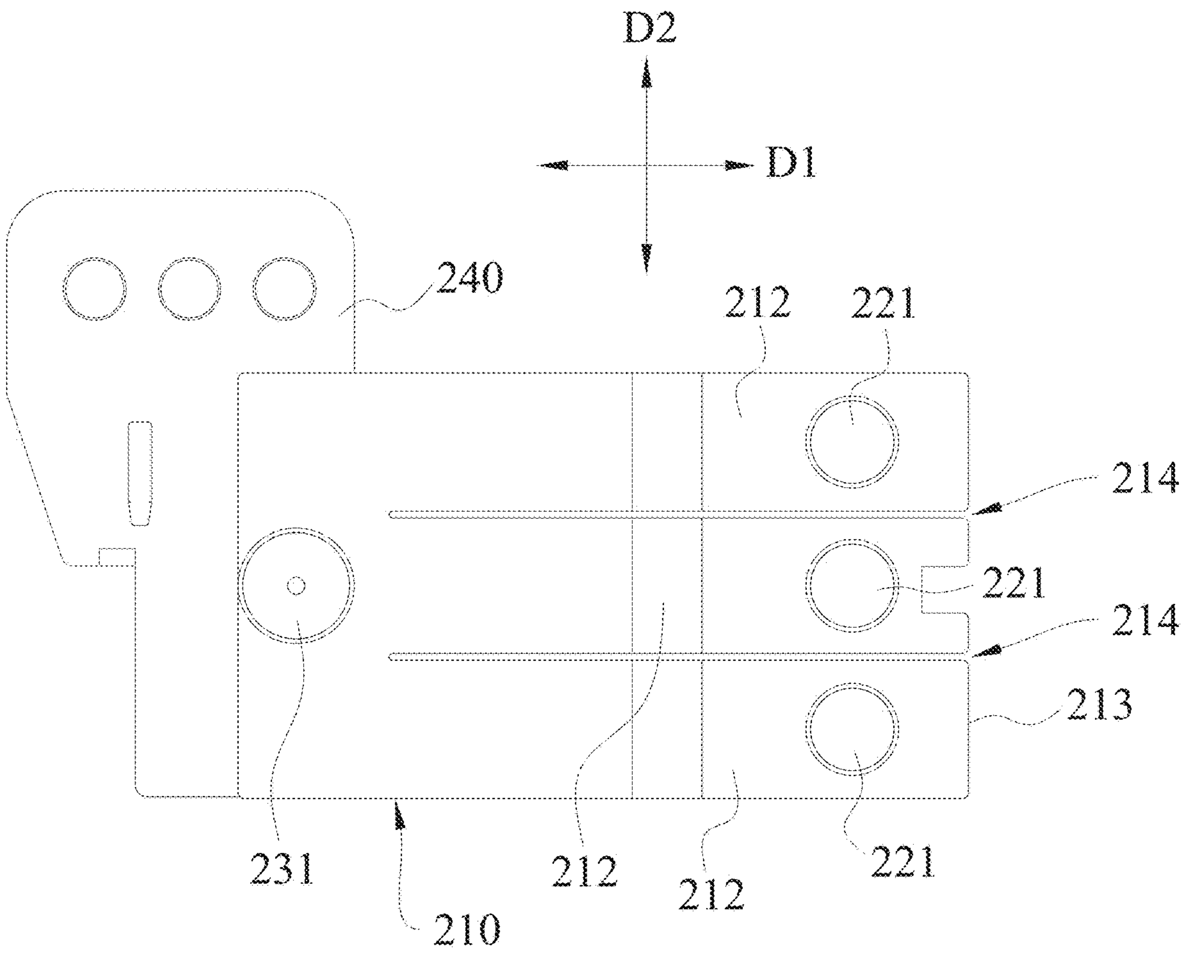
FIG. 11 shows a top schematic view of one of the movable contact parts in the contact part according to a third embodiment of the present disclosure.

As shown in FIG. 11, compared to the contact part 20 of the second embodiment, the contact part 20 of the third embodiment has a substantially similar structure in its basic configuration. Therefore, in the following description of the contact part 20 of the third embodiment, the structures already described in the second embodiment will not be repeated. In addition, the structures in the contact part 20 of the third embodiment that are the same as those described in the second embodiment will be denoted by the same reference numerals. Therefore, in the following description of the present embodiment, the differences between the contact part 20 of the third embodiment and the contact part 20 of the second embodiment will be mainly described.

In this embodiment, the contact part 20 includes four sets of contact sets, among which the number of contact sets of the arc-resistant end contact 250 is 1, and the number of contact sets of the current-carrying end contact 260 is 3. Among the current-carrying end contact 260, three sets of contact sets are arranged side by side along the width direction D2 of the movable contact piece 210.

The movable contact piece 210 may be provided with a slit 214, or not.

Figure 12:
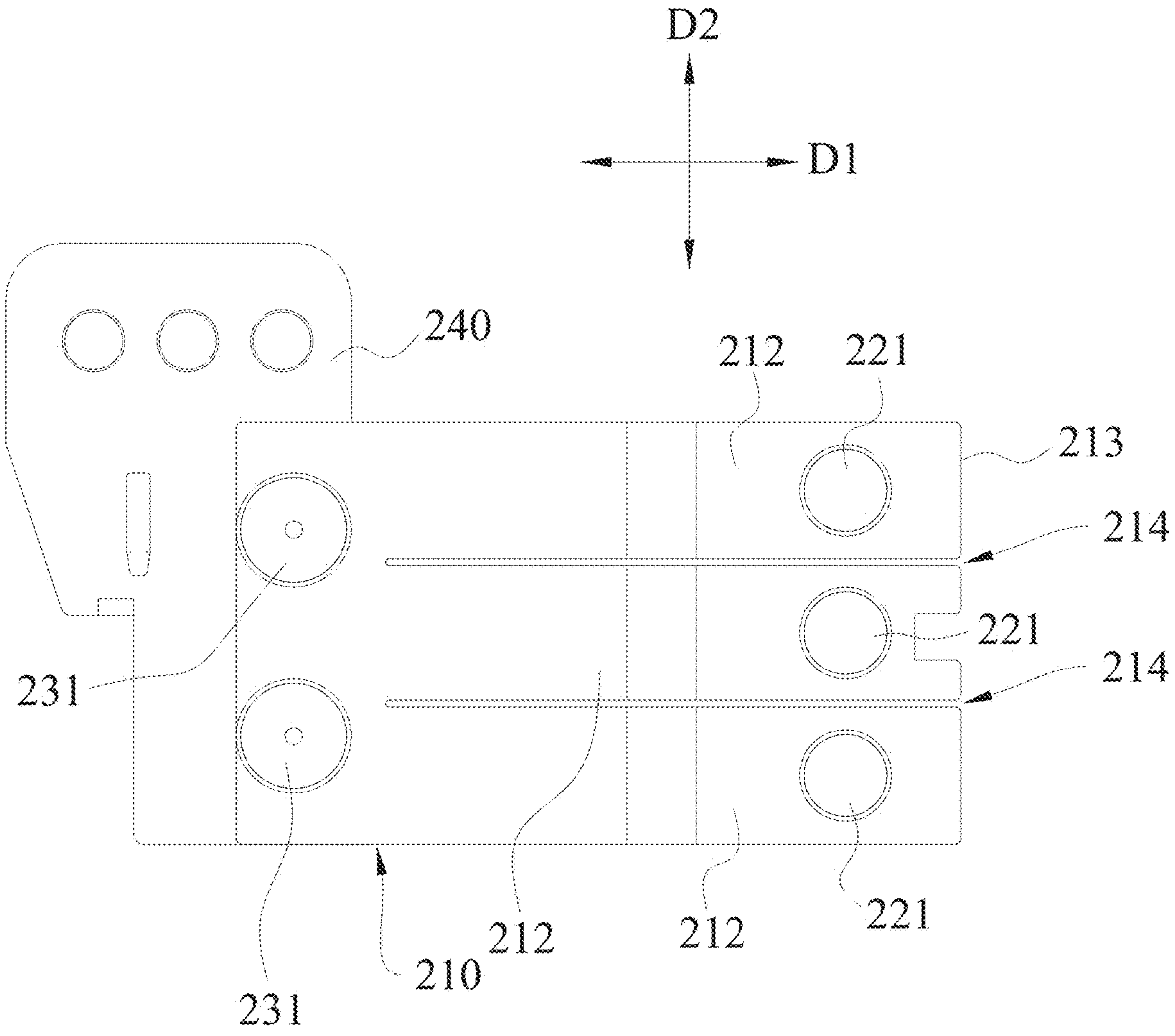
FIG. 12 shows a top schematic view of one of the movable contact parts in the contact part according to a fourth embodiment of the present disclosure.

As shown in FIG. 12, compared to the contact part 20 of the first embodiment, the contact part 20 of the fourth embodiment has a substantially similar structure in its basic configuration. Therefore, in the following description of the contact part 20 of the fourth embodiment, the structures already described in the first embodiment will not be repeated. In addition, the structures in the contact part 20 of the fourth embodiment that are the same as those described in the first embodiment will be denoted by the same reference numerals. Therefore, in the following description of the present embodiment, the differences between the contact part 20 of the fourth embodiment and the contact part 20 of the first embodiment will be mainly described.

In this embodiment, the contact part 20 includes five sets of contact sets, among which the number of contact sets of the arc-resistant end contact 250 is 2, and the number of contact sets of the current-carrying end contact 260 is 3.

In the arc-resistant end contact 250, two sets of contacts are arranged side by side along the width direction D2 of the movable contact piece 210. In the current-carrying end contact 260, three sets of contacts are arranged side by side along the width direction D2 of the movable contact piece 210.

It can be understood that the various examples/embodiments provided by the present disclosure can be combined with each other without contradiction, and detailed examples are not provided herein.

In the embodiments of the present disclosure, the terms "first", "second", "third" are used for descriptive purposes only and should not be understood as indicating or implying relative importance; the term "a plurality of" refers to two or more, unless there is a clear definition otherwise. The terms such as "installation", "connected", "connection", "fixed" should be understood in a broad sense. For example, "connection" can be a fixed connection, or a removable connection, or an integral connection; "connected" can be directly connected, or indirectly connected through an intermediary medium. For the ordinary skilled person in the art, the specific meanings of these terms in the embodiments of the invention can be understood based on the specific circumstances.

In the description of the embodiments of the present disclosure, it should be understood that the terms "upper", "lower", "left", "right", "front", and "rear" indicate a direction or position based on the orientation or position shown in the accompanying drawings. These terms are used only to facilitate the description of the embodiment and to simplify the description, and are not intended to indicate or imply that the device or unit referred to must have a specific direction, be constructed and operated in a specific orientation. Therefore, these terms should not be construed as limiting the embodiments of the invention.

In the description of this specification, terms such as "an embodiment," "some embodiments," "a specific embodiment" refer to the specific features, structures, materials, or characteristics described in conjunction with the embodiment or example being included in at least one embodiment or example of the invention. In this specification, the illustrative terms do not necessarily refer to the same embodiment or example. Moreover, the specific features, structures, materials, or characteristics described may be suitably combined in any one or more of the embodiments or examples.

The above description is merely a preferred embodiment of the present disclosure and is not intended to limit the embodiment. For the person skilled in the art, the present disclosure may be subject to various changes and modifications. Any modifications, equivalent substitutions, improvements, and the like made within the spirit and principles of the embodiments of the present disclosure should be included within the scope of protection of the embodiments of the present disclosure.

What is claimed is:

1. A relay, comprising:

a base;

a contact part disposed on the base and comprising two sets of movable contact parts, each set of the movable contact parts comprising a movable contact unit and a static contact unit; two movable contact units of the contact part corresponding to two static contact units of the contact part, respectively;

a push rod assembly comprising a first push rod and a second push rod, the first push rod and the second push rod being connected to the two sets of movable contact parts, respectively; and a magnetic circuit part comprising a coil assembly and an armature assembly, the armature assembly being pivotally connected to the base around a pivot point, the coil assembly being configured to drive the armature assembly to swing relative to the base;

wherein the armature assembly comprises a first driving end and a second driving end, the first driving end is connected to the first push rod to form a first force point, and the second driving end is connected to the second push rod to form a second force point; a distance between the first force point and the pivot point is not equal to a distance between the second force point and the pivot point.

2. The relay according to claim 1, wherein when the contact part is in a disconnected state, a contact gap between the movable contact unit and the static contact unit corresponding to each other in one set is smaller than a contact gap between the movable contact unit and the static contact unit corresponding to each other in the other set; the movable contact unit and the static contact unit in one set with a smaller contact gap is defined as an arc-resistant end contact, and movable contact unit and the static contact unit in the other set with a larger contact gap is defined as a current-carrying end contact;

the first push rod is configured to drive the movable contact unit and the static contact unit of the current-carrying end contact to connect or disconnect, and the second push rod is used to drive the movable contact unit and the static contact unit of the arc-resistant end contact to connect or disconnect; and a distance between the first force point and the pivot point is greater than a distance between the second force point and the pivot point.

3. The relay according to claim 2, wherein the movable contact unit comprises one or more movable contacts, the static contact unit comprises one or more static contacts, and the movable contacts and static contacts corresponding to each other form a contact set; the arc-resistant end contact comprises one or more contact sets, and the current-carrying end contact comprises one or more contact sets;

a number of the contact sets of the arc-resistant end contact is less than or equal to a number of the contact sets of the current-carrying end contact.

4. The relay according to claim 3, wherein the arc-resistant end contact comprises one or two contact sets; and the current-carrying end contact comprises two or three contact sets.

5. The relay according to claim 3, wherein the arc-resistant end contact comprises two contact sets, and the two contact sets are arranged side by side in a width direction of the movable contact part;

the current-carrying end contact comprises two or three contact sets, and the two or three contact sets are arranged side by side in the width direction of the movable contact part.

6. The relay according to claim 1, wherein each set of movable contact parts further comprises a movable contact piece and a movable contact leading-out piece, the movable contact leading-out piece is connected to the movable contact piece; wherein the first push rod and the second push rod are connected to two movable contact pieces in the contact part, respectively;

the movable contact unit is disposed on the movable contact piece, and the static contact unit is disposed at a connection position between the movable contact piece and the movable contact leading-out piece.

7. The relay according to claim 6, wherein the movable contact piece comprises a plurality of sub-contact pieces stacked with each other.

8. The relay according to claim 6, wherein the movable contact piece has a first end and a second end opposite to the first end in its own length direction;

the movable contact unit is disposed at the first end, and the second end is connected to the movable contact leading-out piece.

9. The relay according to claim 1, wherein the first push rod and the second push rod are located on opposite sides of the armature assembly.

10. The relay according to claim 1, wherein the armature assembly comprises a permanent magnet, an armature, and a swinging arm, the permanent magnet, the armature, and the swinging arm are connected as a whole by injection molding;

two ends of the swinging arm are the first driving end and the second driving end.

* * * * *